Jan. 19, 1932.  F. A. HOWARD ET AL  1,842,096
METHOD OF CONTROL OF PYROLYSIS OF HYDROCARBON OILS
Filed Dec. 31, 1926.
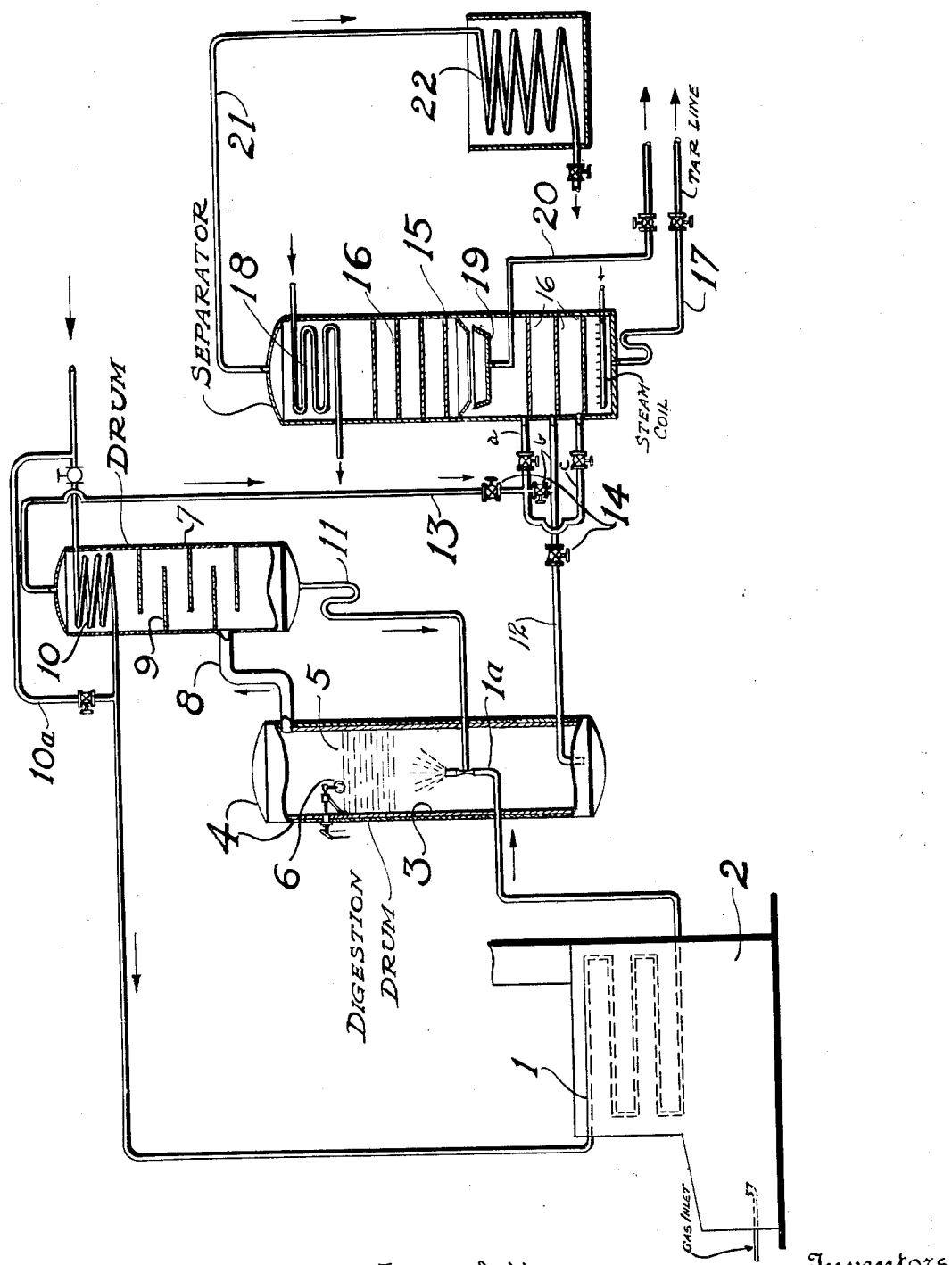
Frank A. Howard
and Nathaniel E. Loomis
Inventors
By their Attorney Patented Jan. 19, 1932

1,842,096

UNITED STATES PATENT OFFICE

FRANK A. HOWARD, OF ELIZABETH, AND NATHANIEL E. LOOMIS, OF WESTFIELD, NEW JERSEY, ASSIGNORS TO STANDARD OIL DEVELOPMENT COMPANY, A CORPORATION OF DELAWARE

METHOD OF CONTROL OF PYROLYSIS OF HYDROCARBON OILS

Application filed December 31, 1926. Serial No. 158,159.

This invention relates to the pyrolysis of hydrocarbon oils and comprises a method of controlling the course of the pyrolytic reaction. Our method will be understood from the following description, reference being made to the drawing which illustrates one form of apparatus constructed according to the invention.

The drawing represents in diagrammatic form a sectional view in elevation of the cracking coil, digesting chamber, separating equipment and the means for controlling the operation.

Referring specifically to the drawing, the character 1 designates a heating and cracking coil, mounted in a setting 2 and adapted to raise the temperature of a stream of oil flowing through the coil to a point in excess of 800° F. The coil discharges into a digestion drum 3 which is protected against excessive loss of heat by insulation 4 and which is adapted to withstand pressure in excess of 300 lbs. per square inch. The coil 1 extends into the drum 3 by a short length $1^a$ discharging the oil in an upward direction. The liquid level in the drum is indicated at 5 and is registered by any suitable means, such as a float gage 6. Vapor evolved from the liquid finds exit from the drum 3 by a vapor line 8 which discharges into an auxiliary drum 7. The drum 7 is fitted with baffling means in its lower section, indicated generally at 9, and a preheating coil 10 for providing reflux is placed above the baffle plates. A by-pass line $10^a$ is connected around the coil 10 so that the cooling in the auxiliary drum may be regulated as desired. A trapped reflux line 11 conducts the condensate produced by the cooling from the lower part of drum 7 to the digestion drum 3 and the line 11 is shown connected to the section of pipe $1^a$ within the drum 3. Liquid from drum 3 is withdrawn by valved line 12, and is discharged in intimate contact with vapor from the auxiliary drum into a separator 15, the vapor being discharged by either of the three valved lines $a$, $b$, or $c$. The system comprising coil 1, digestion and auxiliary drums 3 and 7, is maintained under substantially the same pressure.

The residual liquid from drum 3 and the uncondensed vapors from drum 7 pass through reduction valves 14 with a substantial reduction of pressure and discharge into the separator 15. The separator is provided with fractionation plates shown generally at 16, a steam spray, and a bottom line 17 for the removal of unvaporized tar. A cooling coil 18 is placed above the plates 16 and condensate produced by this coil is caught in a pan 19 and removed by line 20. The uncondensed vapors leave the separator by line 21 which is connected to a condensing means 22 and storage tanks (not shown).

In the operation of our process, the oil to be treated is passed through the preheater coil 10 and thence through the coil 1 in which the temperature is raised to a point sufficient to produce vigorous cracking. The pyrolysis continues in the drum 3 with an evolution of vapors which pass into the auxiliary drum 7, where condensation of a part of the vapor occurs. The condensate returns to drum 3 and the temperautre of the oil therein is regulated in this way by the cooling coil 10. The vapors from drum 7 unite with the heavy residuum from drum 3 with obvious advantages in subsequent distillation.

Illustrating our process, a gas oil is heated to approximately 875° F. during its passage through a heating coil and is discharged into a digestion drum held under a pressure of 350 pounds per square inch. The pyrolysis is completed in the drum and a substantial quantity of the oil is vaporized and enters the auxiliary drum wherein a part is condensed and returned to the digestion drum for the purpose of regulating temperature. The uncondensed portion is drawn from the top of the auxiliary drum and is discharged to the separating equipment under a pressure of about 60 pounds per square inch, together with a stream of liquid oil drawn from the lower portion of the digestion drums. The stream of liquid will be at a temperature of approximately 775° F. before reduction of pressure and discharge into the separating tower. Separation of the products yields gas, gasoline, an intermediate boiling product, and a heavy tar. The feed to the heating coil is preheated by passage through a coil in the auxiliary drum, as described, with obvious advantages, and the temperature of the digestion drum is controlled at a point considerably below that of the discharge from the coil.

Our invention is not to be limited by any theory or explanation which may be given for the mechanism of the process. We do not wish to be limited by any example of the operation which is given simply for purposes of illustration but only by the following claims.

We claim:

1. A process for pyrolysis of hydrocarbon oil comprising the steps of digesting a body of heated oil under conditions permitting vaporization, condensing a portion of the vapors evolved, withdrawing a stream of oil from said body, discharging said stream of oil without substantial loss of heat into a separation zone in intimate contact with the uncondensed portion of said vapor, and fractionating the mixture in said separation zone.

2. Process according to claim 1, in which condensate is commingled with the oil in the digestion zone.

3. Apparatus for the treatment of hydrocarbon oil, which comprises a digestion drum, a cracking coil adapted to deliver oil to the drum, a partial condenser communicating with the drum to condense vapors issuing from the drum, means for injecting the condensate into the liquid entering the drum, a separator, and means for introducing uncondensed vapors from the partial condenser together with residuum from the drum into the separator.

4. Apparatus for the treatment of hydrocarbon oil, which comprises a system including a digestion drum, a cracking coil adapted to deliver oil into the drum, a partial condenser communicating with the drum to condense vapors issuing from the drum, means for injecting the condensate into the liquid entering the drum, means for maintaining greater than atmospheric pressure in the system, a separator, and means for introducing uncondensed vapor from the partial condenser together with residuum from the drum into the separator under reduced pressure.

5. A process for the pyrolysis of petroleum oil which comprises heating a stream of oil to a cracking temperature, passing the heated oil to a digestion zone in which vaporization of at least some portion of said oil occurs, partially condensing the vaporized portion to produce a condensate, commingling the condensate so produced with the oil passing from the heating to the digestion zone, transferring the commingled material to the digestion zone, the amount of condensate so produced and commingled being in quantity sufficient to control the temperature of the oil in the digestion zone, withdrawing a stream of liquid from the digestion zone and discharging it without substantial loss of heat into intimate contact with uncondensed vapor.

In testimony that we claim the foregoing as our invention, we affix our signatures.

FRANK A. HOWARD.
NATHANIEL E. LOOMIS.